United States Patent [19]
Somers

[11] 3,961,763
[45] June 8, 1976

[54] DEVICE FOR GUIDING A MAGNETIC TAPE IN A RECORDING CASSETTE

[76] Inventor: Stanley Brice Lascelles Somers, 5, Quai du Mont-Blanc, Geneva, Switzerland

[22] Filed: June 3, 1974

[21] Appl. No.: 476,155

[30] Foreign Application Priority Data
June 8, 1973  Switzerland.......................... 8411/73

[52] U.S. Cl.................................. 242/199; 242/76
[51] Int. Cl.².................... G03B 1/04; G11B 15/32; G11B 23/04
[58] Field of Search ........... 242/199, 200, 197, 198, 242/210, 76, 71.2, 75.43, 75.45; 352/72, 78 R

[56] References Cited
UNITED STATES PATENTS
3,065,922  11/1962  Ballauf................................ 242/199
3,841,582  10/1974  Schaeffer et al.................... 242/199

FOREIGN PATENTS OR APPLICATIONS
536,146  10/1931  Germany............................ 42/71.2

Primary Examiner—Leonard D. Christian

[57] ABSTRACT

In a device for guiding a magnetic tape in a recording cassette on two spools which serve alternately as the rewinding and unwinding spools, respectively, the whole guiding device merely takes the form of a single part for each spool, said part being designed as a one-piece lever and pivotable around an axis parallel to the spool axis.

14 Claims, 7 Drawing Figures

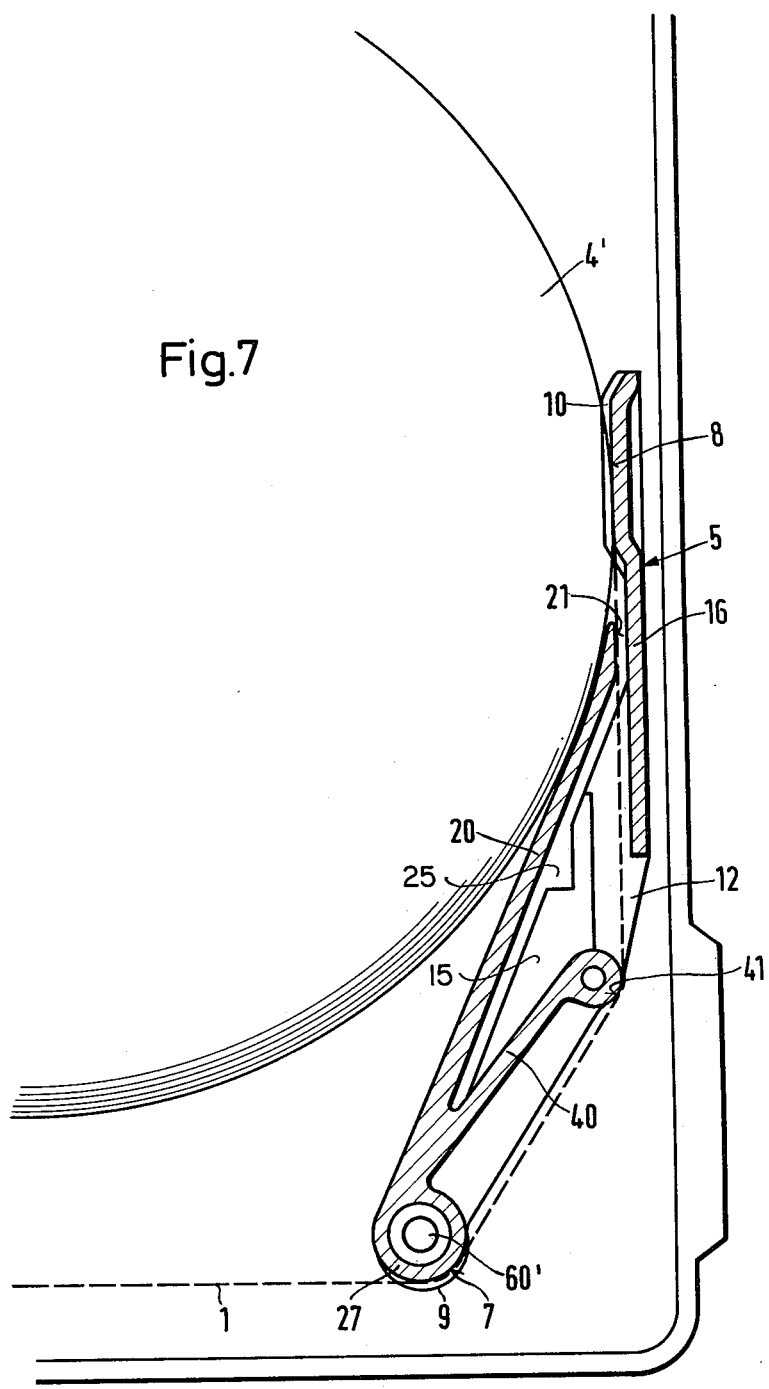

DEVICE FOR GUIDING A MAGNETIC TAPE IN A RECORDING CASSETTE

BACKGROUND OF THE INVENTION

The invention relates to a device for guiding a magnetic tape in a recording cassette on two spools which serve alternately as the rewinding and unwinding spools, respectively.

It has been found that in known recording cassettes of this kind the process of rewinding the magnetic tape onto a spool is frequently faulty because the tape is sometimes wound up "in stages", which may give rise to the danger of the tape and spool blocking. The cause of such faulty rewinding normally consists in the fact that the tape is not guided correctly inside the cassette.

On the other hand, when the tape is being unwound from a spool, static electricity is generated which promotes the adhesion of the unwound tape to the outer turn of the tape coil on the spool. This may cause the tape to form a loop inside the cassette, for example on winding back quickly when the braking device does not slow down the unwinding spool and the rewinding spool simultaneously. Unless this loop is made to disappear by the rewinding spool when the recorder is switched over to the "recording/playback position" where the tape is moved forwards at normal speed, a further loop will often form around the sound head or around the pressure roller interacting with the sound head. This then means that the tape has to be drawn out of the cassette, often causing the tape to be destroyed.

In certain types of known cassettes use is made of movable guides for the tape consisting generally of injection-moulded rollers which turn on axle pivots made of stainless steel. These axle pivots are respectively arranged on the appropriate cassette halves in the right and left-hand corners close to the edge in front of the cassette. These rollers are designed to guide the tape as long as possible along a straight path in front of the front or open side of the cassette. Importance attaches to this in the recording or playback position in particular because the slightest deviation or irregularity of the tape along this path may lead to phenomena which are known as "whining" or "howling" and exercise an extremely detrimental influence on tape recording and/or playback.

Known cassettes of this kind, which make use of separating arms to prevent the tape from adhering to the coil under the action of the static electricity, therefore have a total number of six parts to exercise the guiding function for the tape, i.e. one arm, one guide roller and one separate swivel axis for the arm on each side of the cassette.

In known guiding devices for the magnetic tapes in cassettes, another disadvantageous factor is that it is extremely difficult to thread the tape into the guiding device and take it out again.

The object of the invention is therefore to avoid these disadvantages and to provide a device of the kind named at the beginning which can be manufactured very simply and easily and circumvents the constructional costs peculiar to the known guiding devices. The device to be provided is furthermore intended to ensure that the tape is correctly guided in the cassette with a minimum of friction, this being of importance when the cassette is employed for audio-visual recorders or magnetic memories that are required to work precisely. Finally, the threading of the tape into, and removal from, this guiding device are also designed to be carried out with great ease and facility thanks to the design of the device so that the threading and removal processes can be done in one step, respectively.

SUMMARY OF THE INVENTION

According to the invention the device of the type named at the beginning is so designed that the whole guiding device merely takes the form of a single part for each spool. This part is designed as a one-piece lever and can swivel around an axis parallel to the spool axis. This means that three parts are now no longer required as a guiding device for each spool, merely a single one-piece part being needed instead which can moreover be manufactured very simply and easily, for example by means of injection moulding with plastics. Not only a separate guide roller is saved in this way but the constructional effort is also simplified because an identically designed one-piece lever can be used for the rewinding and unwinding spools, respectively.

In one embodiment of the invention this lever has angled arms running in opposite directions relative to its swivel axis. One of these arms is designed as a swivelling edge guide which holds the tape at the same feed angle whatever the position of the lever whereas the other angled arm is designed in conjunction with a guide arm for the tape in the form of a pressure arm which serves to separate the tape from the coil when the tape is unwinding from the spool. This swivelling edge guide, which is joined to the lever as one piece and forms one of the angled arms of the lever, advantageously performs the function of the formerly used, separate guide roller, a further advantage being gained here owing to the fact that the swivelling edge guide uniformly follows each movement of the lever and does not describe in itself any kind of disturbing axial or any other undesired movement, as was the case with the formerly used, moving guide rollers. This ensures that the above-mentioned phenomena of howling or whining cannot occur with the magnetic tape. The other angled arm of the lever, which extends in the opposite direction to the swivelling edge guide, is so shaped that it forms a guide arm for the tape and a pressure arm simultaneously. The tape runs onto or off the coil between the guide arm and pressure arm, which means that the guide arm always rests on the magnetic tape from the outside. In contrast, the pressure arm serves to separate the tape from the coil so that a single one-piece part in the form of the lever according to the invention performs, as demonstrated here, all the functions which have to be exerted with respect to the magnetic tape between the coil on the spool and the sound head.

It is preferable when the guide arm is so designed that it guides the tape strictly at a tangent to and from the spool before the tape touches the tape coil on the spool, that it similarly guides the tape the moment that tape touches the spool and that it similarly also guides the outer part of a coil of tape on the spool.

A further decisive feature of the invention consists in the fact that the lever is open on the top side to facilitate the tasks of inserting and removing the tape. These processes can therefore be carried out easily and simply in a single step without the danger arising that the tape will be destroyed upon insertion or removal.

In accordance with an embodiment of the invention the pressure arm is designed in the form of a pivot forming one piece with the lever and projecting roughly perpendicularly upwards. This pivot is arranged close to the free end of the guide arm at a distance from that guide arm.

In accordance with another embodiment the pressure arm may be designed as a compensating lever which is influenced by the tape and compensates the swivelling force exerted on the lever by the tape on unwinding via the swivelling edge guide.

Further advantages are obtained when the pressure arm and/or guide arm of the lever is designed resiliently.

BRIEF DESCRIPTION OF THE DRAWING

The invention is explained below in more detail in the form of several preferred embodiments with reference to the drawings

FIG. 4 is a fragmentary view partially in section which shows a modified embodiment of the lever in the cassette in an outermost position, while FIGS. 6, 7 are fragmentary views partially in section which show further modified embodiments.

DESCRIPTION OF THE PREFERRED EMBODIMENTS

Figure 1:
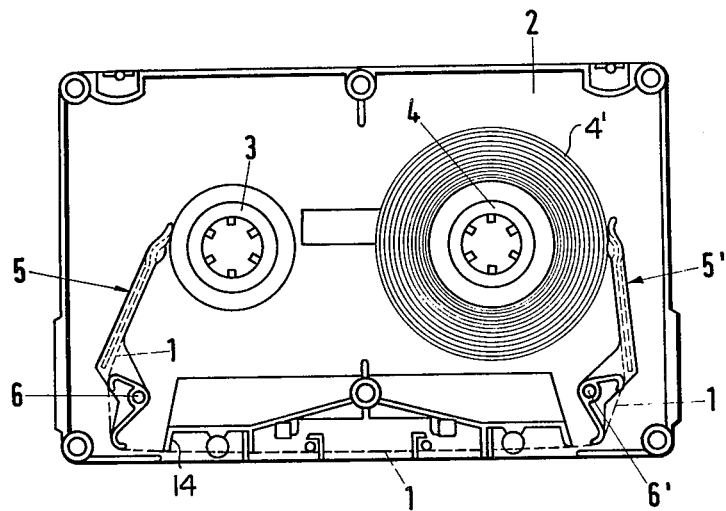
FIG. 1 is a plan view which shows the inside of the cassette furnished with the guiding device.
Figure 2:
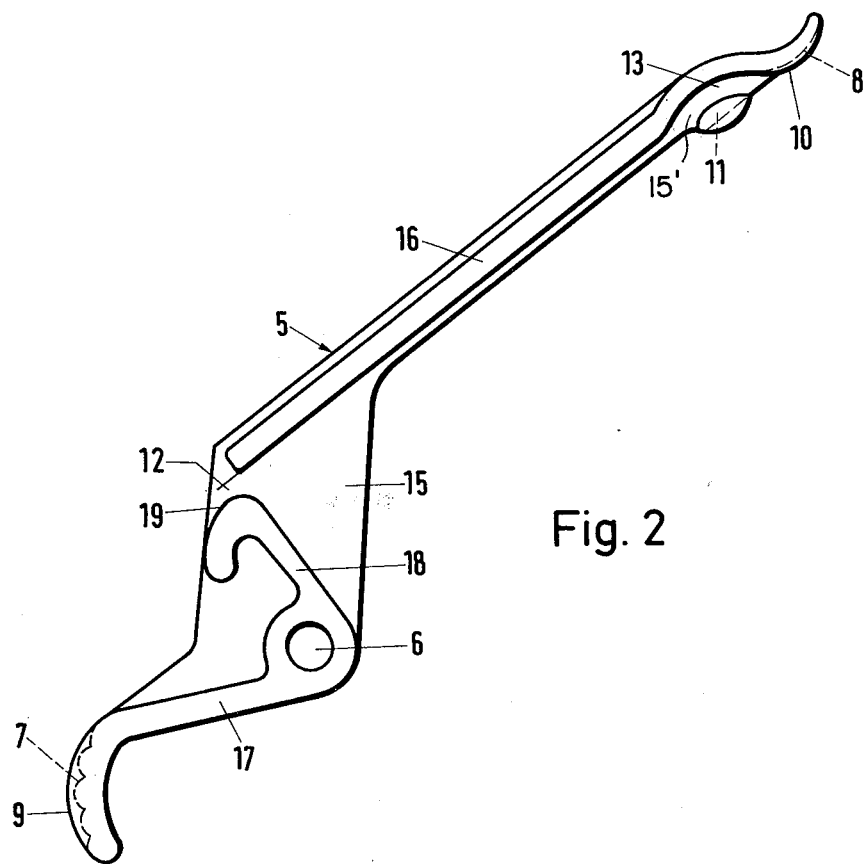
FIG. 2 is a fragmentary view partially in section which shows the left guide lever alone.

The device illustrated in FIG. 1 serves to guide a magnetic tape 1 in a recording cassette 2, the cover of which has been omitted in the representation shown in FIG. 1. Magnetic tape 1 is alternately wound onto and off two flangeless hubs or spools 3 and 4, to form thereon, respectively, coils 3' and 4' of such tape. Two levers 5, 5' arranged symmetrically to the cassette axis and otherwise identically are provided to guide magnetic tape 1. Levers 5, 5' interact with spools 3 and 4, respectively, and are pivotably arranged on fixed axle pins 6, 6' parallel to the spool axes. As shown in FIG. 2, each lever has a bottom base plate 15 which is arranged perpendicularly to its swivel axis and on which are arranged ribs 16, 17, 18 forming one piece with said base plate and projecting perpendicularly thereto. As can be seen very well in FIG. 2, rib 16 forms at its front end a contact and guide surface 8 for magnetic tape 1 whereas rib 18 forms at its free end a deflection and guide surface 19 for magnetic tape 1 and rib 17 similarly has a guide surface 7 at its free end. Each of the two surfaces 7 and 8 is furnished with a pair of lateral guide flanges, shown as 9, 9' and 10, 10' respectively, for guiding tape 1.

Between mutually facing terminal portions of rib 16 and rib 18 there is a slot or opening 12 so that magnetic tape 1 can pass through lever 5 as it were. It can run from an outer side 17A of lever 5 facing away from spool 3 and including surfaces 7 and 19, to the other or inner side, 16A facing the spool and including surface 8.

The contact and guide surface 8 of lever rib 16, arranged on the inside of lever 5, faces spool 3 whereas guide surface 7 of rib 17, provided on the outside of lever 5, faces away from spool 3.

Figure 3:
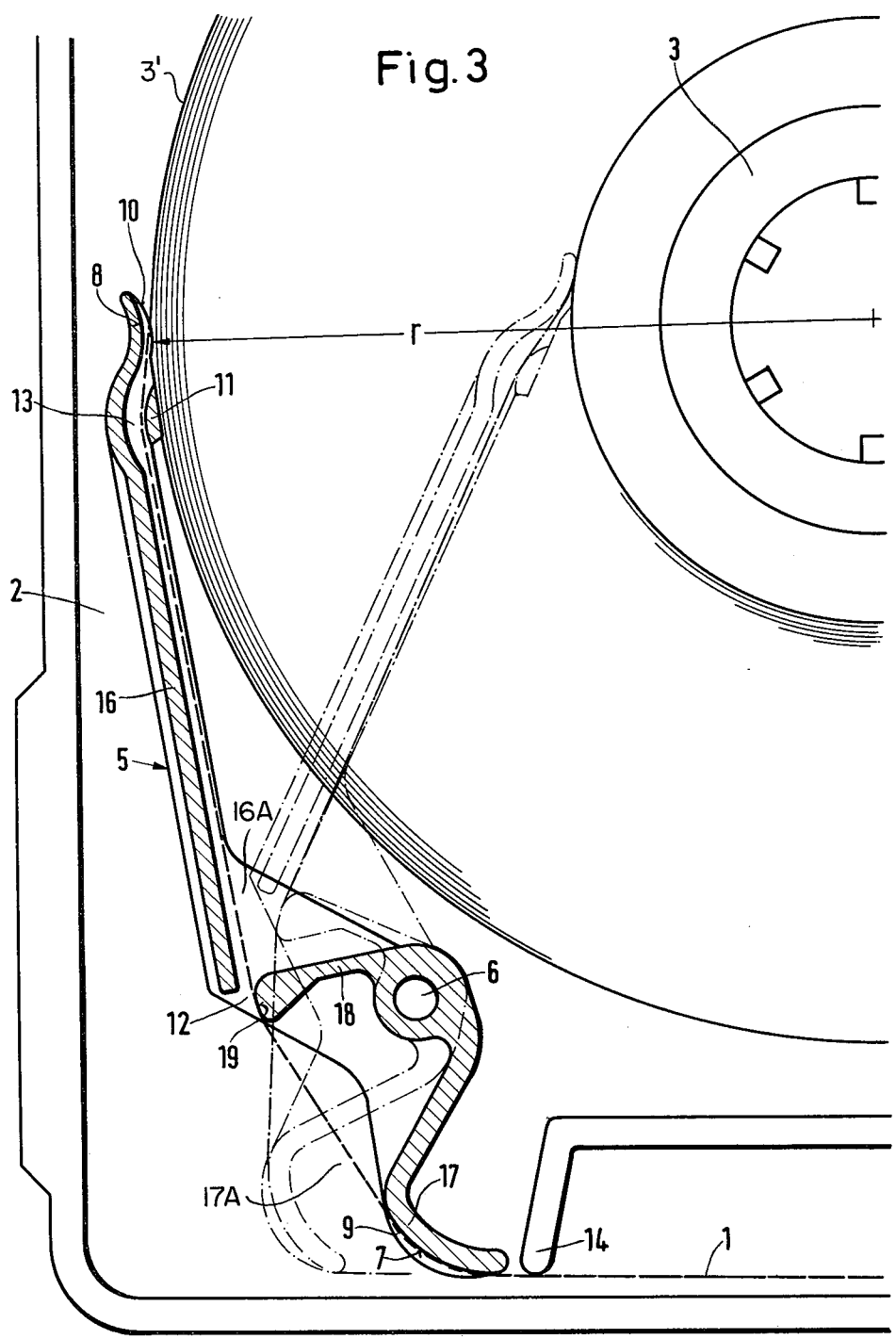
FIG. 3 is a fragmentary view partially in section which shows the guide lever installed in the cassette in two different positions.

The two possible extreme positions of lever 5 are illustrated in FIG. 3, the lever position designated by solid lines being the outermost position when coil 3' on spool 3 is fully wound up, whereas lever 5 takes up the innermost position designated by dash-dot lines when spool 3 is empty.

When spool 3 is unwinding, magnetic tape 1 runs consecutively past contact and guide surface 8 of rib 16, between flanges 10. It runs then through a space 13 which is formed between the guiding end 8, 10 of rib 16 and a separating or pressure arm 11 secured to an innermost portion 15' of baseplate 15, in front of rib 16; it then passes through slot 12, rests on guide surface 19 of rib 18, and then runs around guide surface 7 of rib 17 to a guide 14 of cassette 2.

The position of guide surface 7 of rib 17 in relation to the swivel axis and the profile of said guide surface 7 have been so selected that the magnetic tape always forms a strictly straight line between the delivery point from said guide surface 7 and guide 14 of cassette 2, regardless of the extent to which spools 3 and 4 are wound up or unwound. This is shown very clearly in FIG. 3.

The locations of axle pins 6 and 6' in cassette 2 have been so chosen that contact surfaces 8 swivel along an arc, the chord of which roughly coincides with radius $r$ of coils 3', 4' on spools 3 and 4.

Thus it will be seen that according to the invention the whole guiding device for each spool 3 and 4 requires, merely a single part which is designed as a one-piece lever 5 and 5', respectively, and can swivel around an axle pin 6 and 6', respectively, parallel to the spool axis. Each lever 5, 5' has first and second end portions or arms running in opposite directions relative to its swivel axis 6, one of the arms being designed as an angled swivelling edge guide in the form of rib 17 concave toward spool 3. As mentioned already, said swivelling edge guide 17 has on both sides of a guide surface 7 two lateral guide flanges 9 for the tape and is so shaped that tape 1 always runs in a strictly straight line between the delivery point from said guide surface 7 and cassette guide 14 whereby irregularities such as whining and howling effects are avoided.

When being wound up onto spool 3 for example, the tape guided by lever 5 runs across guide surface 7 of swivelling edge guide 17 from the outside of lever 5 — seen relative to spool 3 — to the inside of lever 5 to the other angled arm, magnetic tape 1 then passing, as mentioned already, through slot 12 provided in lever 5 and sliding along guide surface 19 of lever rib 18 in an angled tape path 7-19-8 which is slightly concave toward spool 3.

The end portion 16 of angled arm 18, 16 of lever 5 performs a double function. It is designed as providing (1) a guide arm in the form of rib 16 and (2) a pressure or separating arm 11 which serves to separate tape 1 from the tape coil 3', 4' when the tape is being unwound from spool 3 or 4 respectively. Accordingly, the forward angled lever arm 18, 16 comprises guide means 8, 10 and pressure means 11. As already mentioned, guide arm 15, 16 comprises rib 16 projecting perpendicularly away from the bottom lever base plate 15 and forming one piece with the latter, and has at its free end the contact and guide surface 8 for tape 1 which is limited by two lateral flanges 8. Here, as shown in FIG. 3, guide arm 16 or especially its free end, i.e. contact and guide surface 8, is so designed that tape 1 is guided strictly at a tangent to and from spool 3 before a tape coil 3' is formed on the spool, and tape 1 is similarly guided whenever it touches the coil 3'. The two lateral flanges 10 guide the outer edges of the coil 3' of tape 1.

Pressure arm 11 is designed as a pivot forming one piece with lever 5 and projecting perpendicularly upwards from its base plate 15. Said pivot is arranged close to the free end of guide arm or rib 16 at a distance from the latter. This distance takes the form of space 13. Both space 13 and slot 12 are open on the top side, opposite base plate 15, so that lever 5 as a whole is also open on the topside. This greatly facilitates and simplifies the tasks of inserting and removing magnetic tape 1. Pressure arm 11 performs a double function. In the first place it is pressed by tape 1, as shown in FIG. 3 for example, in the direction toward the spool 3 when magnetic tape 1 is being wound onto spool 3. This means that, as also shown in FIG. 3, the whole of lever 5 tends to turn around swivel axis 6 in the clockwise, inward direction so that guide arm 16 together with its guide and contact surface 8 always rests on tape 1 where the tape runs onto spool 3 or coil 3', or from it, while securely guiding said tape, and also on the outer part of the tape coil 3' already formed. The other function of pressure arm 11 consists in the fact that tape 1 unwinding from spool 3 runs past contact and guide surface 8 of guide arm 16 and into space 13 between the free end of guide arm 16 and pressure arm 11 and is guided, after passing through lever slot 12, past guide surface 7 of swivelling edge guide 17 to guide 14 of cassette 2 and therefrom to the other spool 4. Here, such a swivelling force is exerted by tape 1 on swivelling edge guide 17 in particular as to apply a compensating lever moment to lever 5 tending to pivot it in the anti-clockwise direction as shown in FIG. 3. Consequently, pressure arm 11 is also urged to move always slightly (see FIG. 3) to the left so that magnetic tape 1 unwinding from spool 3 is securely separated from the coil and the disadvantageous effects do not occur that otherwise arise from the static electricity formed.

To assist the functions performed by guide arm 16 and pressure arm 11, it is advantageous to make them resilient.

Figure 4:
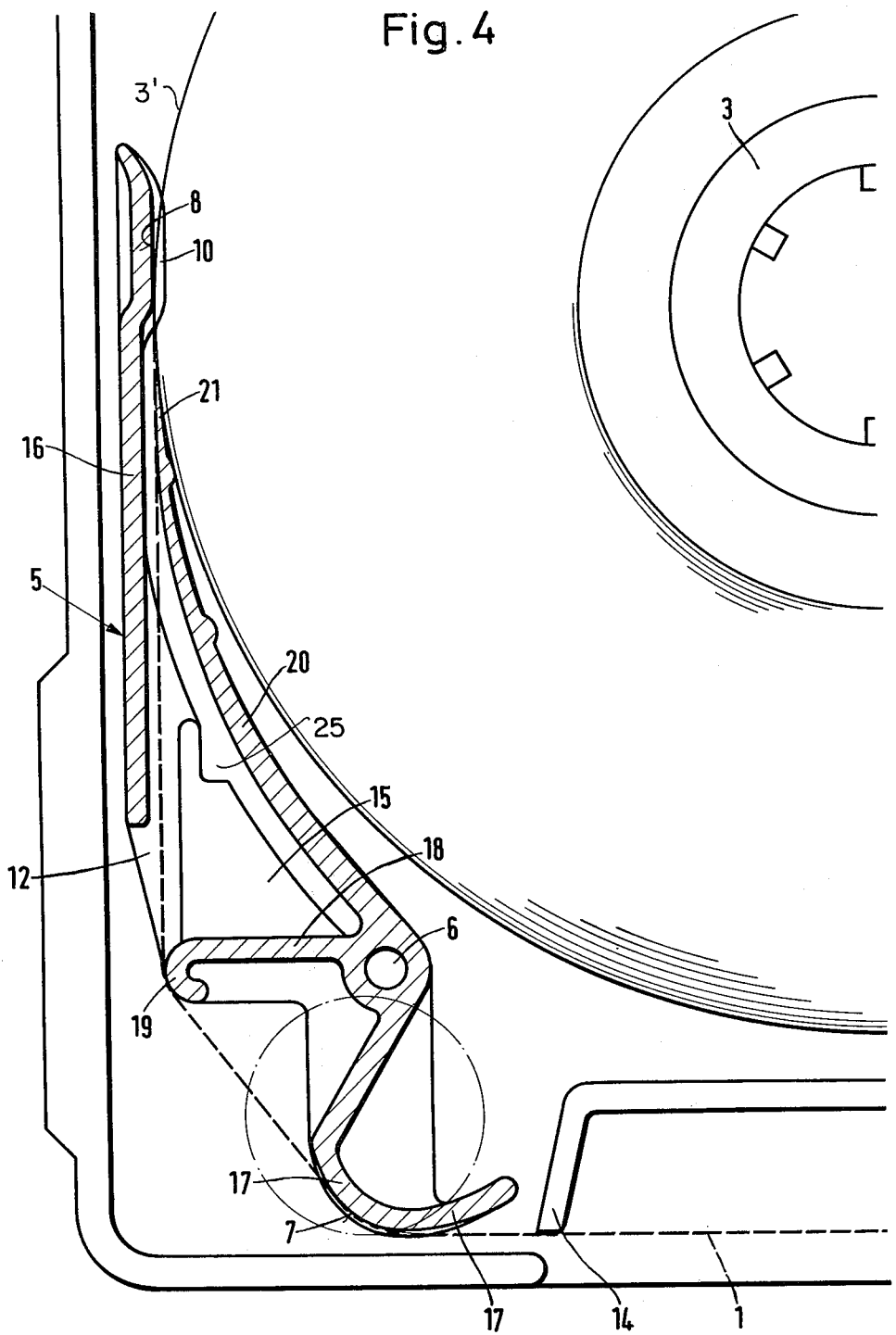
Figure 5:
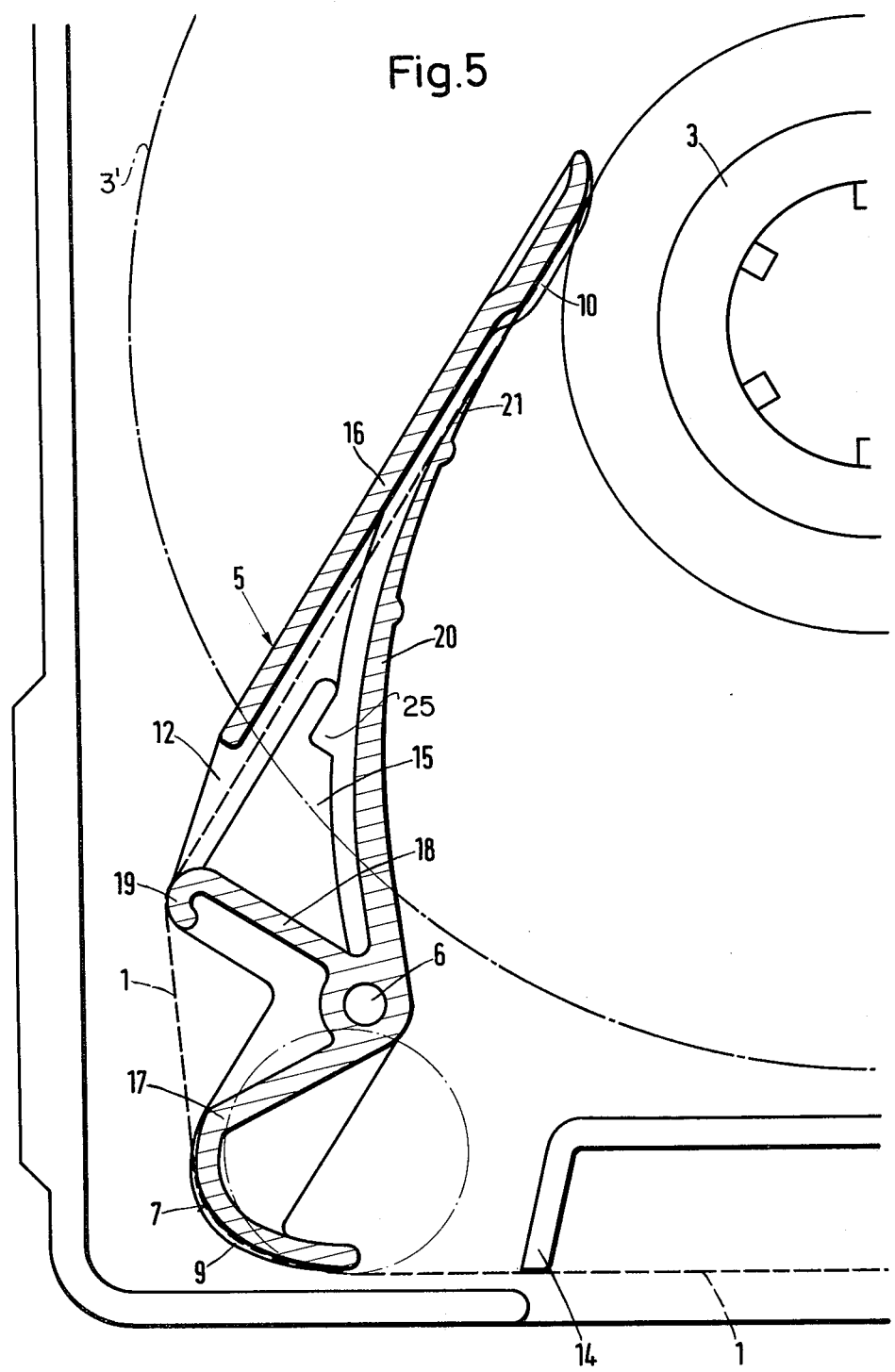
FIG. 5 is a fragmentary view partially in section which shows this embodiment in the other extreme position.

In the modified embodiment shown in FIGS. 4 and 5, the pressure arm is not designed as a pivot 11 but as a compensating lever 20 which projects away freely — without restraint by baseplate 15 from the swivel axis of lever 5 and which is very resilient thanks to its design and ends in a long tip 21, as shown in FIGS. 4 and 5. This pressure or separating arm 20 resembles pivot 11 of FIGS. 2 and 3 in that it is influenced by magnetic tape 1 in such a manner that on the one hand it is swivelled, when tape 1 runs onto spool 3, by said tape 1 in the clockwise direction and therefore turns the whole of lever 5 also in the clockwise direction so that the free end of guide arm 16 together with contact and guide surface 8 and the two lateral flanges 10 securely perform the functions assigned to it. On the other hand, however, the function of separating tape 1 unwinding from spool 3 is performed especially well by tip 21 provided on pressure arm 20. As in the other embodiment, or more so, the unwinding tape 1 pivots swivelling edge guide 17 in the anti-clockwise direction so that the whole of lever 5 is also turned in the anti-clockwise direction and pressure arm 20 tends to swivel to the left to separate the unwinding tape 1 from the coil. As also shown in FIGS. 4 and 5 for this embodiment, baseplate 15 has a notch 25 opposite resilient arm 20.

The slot 12 is designed as a relatively broad opening which is open on top just like the whole of the remainder of lever 5. Finally, the free end of guide arm 16 is also straight and designed in such a manner that magnetic tape 1 runs tangentially onto and off spool 3, or as shown, onto and off coil 3', being securely guided. As clearly shown in FIG. 4 for example, the outer part of the tape coil 3° is moreover still guided by the two flanges 10 of the free end of guide arm 16, when tape 1 is wound up to provide the coil. This prevents the coil from assuming a wavy form, as would otherwise happen automatically.

Figure 6:
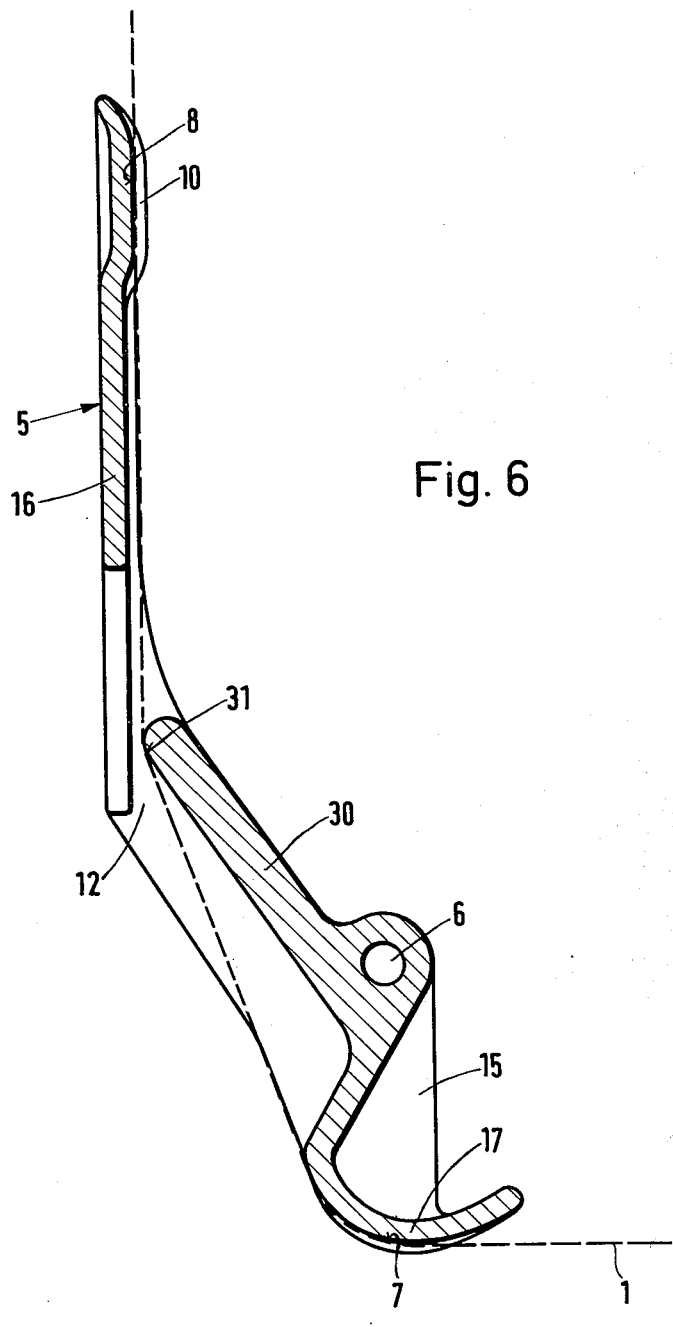

In the other modified embodiment shown in FIG. 6, the design is such that pressure arm 20 and rib 18 with its guide surface 19 are united in a single part which is designed in the form of a compensating lever 30 with a forward end surface providing a deflector 31 for tape 1. Said compensating lever 30 extends roughly to a point which is in the middle between guide surface 19 and tip 21 of pressure arm 20 in the embodiment according to FIGS. 4 and 5. Here, one has to make sure that compensating lever 30 extends so far with its deflector 31 that there is a balance of forces relative to swivelling edge guide 17, this balance of forces being such that on the one hand a swivelling force can be exerted in the anti-clockwise direction on lever 5 via swivelling edge guide 17 when tape 1 is unwinding from spool 3, and that on the other hand a swivelling force is exerted in the clockwise direction on lever 5 by part 30 forming the compensating lever when magnetic tape is being wound onto spool 3, so that magnetic tape 1 is guided with the free end of guide arm 16 and applied to the coil.

The modified embodiment of the lever 5 according to FIG. 7 corresponds essentially to that according to FIGS. 4 and 5, particularly with respect to baseplate 15, rib 16 and pressure arm 20, as shown; however, according to this last modification the lever 5 merely has one single angled arm extending outwards from the swivel axis 60'.

In contrast to the previously described embodiments, this axis 60' is situated relatively close to one of the long sides of the recording cassette 2.

According to FIG. 7, a guiding surface 7 for the tape 1 with attached lateral guide flanges 9 at upper and lower sides, basically similar to surface 7 of the other embodiments, is provided on and by a hub or circular-shaped rib 27 which is constructed around the swivel axis 60' of the lever 5. The construction of the guide arm 16 and compensating arm or lever 20 corresponds approximately to that of the embodiment of the lever 5 according to FIGS. 4 and 5. In contrast to the lever rib 18 of the embodiment according to FIGS. 2 to 5, the compensating lever rib 40 of the embodiment of the lever 5 according to FIG. 7 is not approximately at right-angles to the guide arm 16 but, as can be seen in FIG. 7, at an obtuse angle thereto, and directionally-deflecting and guide surface 41 of the lever rib 40 has such a position that the magnetic tape 1 runs from this directionally-deflecting and guide surface 41 of the lever rib 40 exactly in a straight line along the guide surface 21 of the compensating lever 20 and further on, past the guide surface 8 of the guide arm 16, onto the tape coil 4'; this, of course, also applies when the magnetic tape 1 is unwound from this tape coil.

I claim:

1. A one-piece device for guiding a tape in a two-spool cassette, comprising;

a lever;

means for mounting the lever for pivotal movement alternately toward and away from a spool and for defining an inward side of the lever facing the spool and an outward side of the lever facing away from the spool, the lever having a first end portion at least relatively adjacent the spool and a second end portion remote from the spool;

means on the relatively adjacent end portion for guiding a tape along the inward side, adjacent to the spool; and means on the remote end portion for guiding the tape along the outward side, between another spool and the relatively adjacent end portion.

2. A device according to claim 1 additionally including separator means integral with the lever and having a surface on the relatively adjacent end portion of the lever for separating the tape from a coil on the spool to facilitate smooth unwinding of the tape.

3. A device according to claim 2 in which said surface of the separator means extends in a substantially straight line between the guiding means on the relatively adjacent and remote end portions.

4. A device according to claim 2 in which the means for mounting the lever for pivotal movement is disposed in the end portion remote from the spool.

5. A device according to claim 4 in which the remote and relatively adjacent end portions of the lever constitute an angled body concave toward the spool.

6. A device according to claim 5 in which the guiding means on the remote end portion comprises a first, substantially circular guide concentric with the means for mounting the lever for pivotal movement; and a second guide disposed between the first guide and the guiding means on the relatively adjacent end portion for defining an angled path of the tape, between the first guide and the relatively adjacent end portion, concave toward the spool.

7. A device according to claim 6 in which the lever comprises a baseplate; a rib thereon and rigid therewith to define the relatively adjacent end portion; and a second rib on the baseplate and rigid therewith, extending from the first to the second guide.

8. A device according to claim 2 in which the separator means comprises an arm resiliently connected with the remote end portion of the lever and extending therefrom to said surface.

9. A device according to claim 1 in which the lever comprises a baseplate, and the guiding means on the relatively adjacent and remote end portions comprise ribs upstanding from the baseplate and freely exposed opposite the baseplate to facilitate insertion and removal of the tape, onto and from the lever, respectively.

10. A device according to claim 9 in which said ribs extend from the respective ends of the lever to mutually facing terminal portions of the ribs mutually spaced apart to additionally facilitate insertion and removal of the tape, the two guiding means being disposed for guiding the tape from the inward side to the outward side of the lever between the terminal portions of the ribs.

11. A device according to claim 1 in which the guiding means on the relatively adjacent end portion include means for guiding the tape tangentially relative to the spool at a point where an end portion of the tape contacts the spool, and for guiding the tape tangentially relative to a coil on the spool.

12. A device according to claim 2 in which the separator means comprises a relatively short pivot member rigid with the lever and having said surface thereon.

13. A device according to claim 1 in which the lever has first and second arms extending from the means for pivotal mounting and defining respectively the first and second end portions.

14. A device according to claim 1 additionally including an arm integrally attached to said lever between the first and second end portions, and additional guide means for the tape on said arm, the arm being disposed to balance swivelling forces exerted on the lever by the tape guided by the other guide means.

* * * * *